(12) United States Patent
Liao et al.

(10) Patent No.: US 7,517,456 B2
(45) Date of Patent: Apr. 14, 2009

(54) METHOD FOR TREATING LANDFILL LEACHATE

(75) Inventors: Zhi Min Liao, Shenzhen (CN); Jing Kui Guo, Shenzhen (CN); Yu He Huang, Shenzhen (CN); Jing Zou, Shenzhen (CN); Zhi Qiang Chen, Shenzhen (CN); Rui Zhi Dai, Shenzhen (CN); Wen Yan Shi, Shenzhen (CN); Jian Zhong Xiong, Shenzhen (CN); Hai Ying Ji, Shenzhen (CN)

(73) Assignee: Shenzhen JDL Environmental Protection Ltd., Shenzhen (CN)

( * ) Notice: Subject to any disclaimer, the term of this patent is extended or adjusted under 35 U.S.C. 154(b) by 280 days.

(21) Appl. No.: 11/428,554

(22) Filed: Jul. 4, 2006

(65) Prior Publication Data
US 2007/0003370 A1    Jan. 4, 2007

(30) Foreign Application Priority Data
Jul. 4, 2005  (CN) .................. 2005 1 0035803

(51) Int. Cl.
 B01D 61/00   (2006.01)
 C02F 21/01   (2006.01)
 C02F 1/76    (2006.01)

(52) U.S. Cl. .............. 210/652; 210/639; 210/723; 210/752; 210/753; 210/754

(58) Field of Classification Search ........ 210/650–653, 210/195.2, 753, 754, 756, 721, 723, 257.2, 210/639
See application file for complete search history.

(56) References Cited

U.S. PATENT DOCUMENTS

| | | | | |
|---|---|---|---|---|
| 5,100,800 A | * | 3/1992 | Kulpa et al. ............... 435/264 |
| 5,182,023 A | * | 1/1993 | O'Connor et al. .......... 210/652 |
| 6,110,375 A | * | 8/2000 | Bacchus et al. ............ 210/652 |
| 6,113,797 A | * | 9/2000 | Al-Samadi ................. 210/652 |
| 6,461,514 B1 | * | 10/2002 | Al-Samadi ................. 210/652 |
| 6,960,301 B2 | * | 11/2005 | Bradley ..................... 210/663 |
| 7,070,685 B2 | * | 7/2006 | Kühn et al. ................. 205/46 |
| 7,264,732 B2 | * | 9/2007 | Bradley ..................... 210/660 |

* cited by examiner

*Primary Examiner*—Ana M Fortuna
(74) *Attorney, Agent, or Firm*—Matthias Scholl P.C.; Matthias Scholl

(57) ABSTRACT

Methods for treating landfill leachate taught herein comprise: (a) coagulatively settling leachate; (b) filtering the resultant supernatant liquid through multistage cartridges; (c) filtering the filtered liquid by reverse osmosis; and (d) treating the resultant liquid with chlorine-based oxidant. These methods provide the advantages of efficient wastewater treatment, compact equipment size, short process flow, and low startup and operational costs.

8 Claims, 3 Drawing Sheets

METHOD FOR TREATING LANDFILL LEACHATE

CROSS-REFERENCE TO RELATED APPLICATIONS

This application claims priority to the Chinese Patent Application No. 200510035803.1, filed Jul. 4, 2005, the contents of which are incorporated herein by reference.

BACKGROUND OF THE INVENTION

1. Field of the Invention

This invention relates to a method for treating wastewater, and more particularly, to a method for treating landfill leachate.

2. Brief Description of the Background of the Invention

Landfill leachate is seeped wastewater of complicated chemical composition formed when landfill comes to contact with liquids such as rain water. Landfill leachate generally contains high concentrations of various contaminants, including high BOD compounds, high COD compounds, heavy metals, and ammonia nitrogen compounds, as well as other constituents that are difficult to degrade biologically, such as naphthalenes, phenanthrenes and other aromatic compounds, halogenated aromatic compounds, phosphonolipids, phthalic anhydrides, phenols, anilines, and others. Among these are many compounds exhibiting carcinogenesis, teratogenesis and/or mutagenesis. Landfill leachate has strong repugnant odor.

The treatment of landfill leachate is based mainly on the purification by biological and chemical methods, which include degradation of organic substances via metabolic pathways of microorganisms, and via anaerobic and aerobic processes.

As described, for example in Chinese Patent Application No. CN1478737A, the treatment of landfill leachate can include the steps of removing ammonia nitrogen compounds present in the leachate by electrolysis; degrading the leachate biologically with activated sludge in conjunction with filtration through a hollow fiber membrane (MBR/CMF methods); reverse osmosis; and final purification to meet the various standards for water consumption.

This method of treatment, however, has the significant drawback of inhibition of the leachate-degrading activity of activated sludge by high concentrations of ammonia nitrogen compounds present in the leachate. The drawback is associated with the different conditions that are needed for removing ammonia nitrogen compounds, high COD compounds, and high BOD compounds from leachate by biological degradation.

In order to increase the efficiency of leachate degradation by activated sludge, pre-removal of ammonia nitrogen compounds ($NH_3$—N) is generally required. However, during the pre-removal stages, most ammonia nitrogen compounds tend to be discharged directly into the atmosphere causing secondary pollution. In addition, treatment processes employing Membrane Bioreactor and Continuous Membrane Filtration (MBR/CMF) methods are characterized by high equipment and high operating cost associated with high complexity of these processes and high cost of hollow fiber membranes that are employed. The biological degradation processes are generally inefficient, and expensive.

BRIEF SUMMARY OF THE INVENTION

In one embodiment of the invention described herein provided is an investment and cost effective method for treating landfill leachate.

In accordance with one aspect of the present invention, a method for treating landfill leachate comprises the steps of (a) coagulatively settling of landfill leachate to produce a supernatant liquid; (b) filtering the supernatant liquid through a filtration device to produce a first filtered liquid; (c) filtering the first filtered liquid in a reverse osmosis apparatus to produce a second filtered liquid; and (d) treating said second filtered liquid with a chlorine-based oxidant.

In certain embodiments of the invention, after the suspended solids, such as sludge and other solid particles in landfill leachate, are settled in step (a), they are further filtered and separated.

In certain embodiments of the present invention, the filtration device is a 3-stage filtration device comprising: a first stage cartridge filter having wire wound cartridge with pore size of about 10-30 μm; a second stage cartridge filter having a cartridge selected from a wire wound cartridge, a melt spinning cartridge, and a compressed active carbon cartridge, said cartridge having pore size of 5-15 μm; and a third stage cartridge filter having a melt spinning cartridge with pore size of about 3-10 μm.

In certain embodiments, a scale inhibitor is introduced between the second stage filter and the third stage filter.

In certain embodiments, the filtration pressure in the first stage cartridge filter, the second stage cartridge filter, and/or the third stage cartridge filter is between about 0.2 and 0.6 MPa.

In certain embodiments, the pressure of the first filtered liquid in the reverse osmosis apparatus is between about 1.2 and about 3 MPa.

In certain embodiments, during coagulatively settling the leachate to produce a supernatant liquid, the pH of the leachate is adjusted to between about 10.5 and 11.

BRIEF DESCRIPTION OF THE DRAWINGS

Many of the attendant advantages of the present invention will become more readily apparent and better understood as the following detailed description is considered in connection with the accompanying drawings in which.

DETAILED DESCRIPTION OF THE INVENTION

Figure 1:
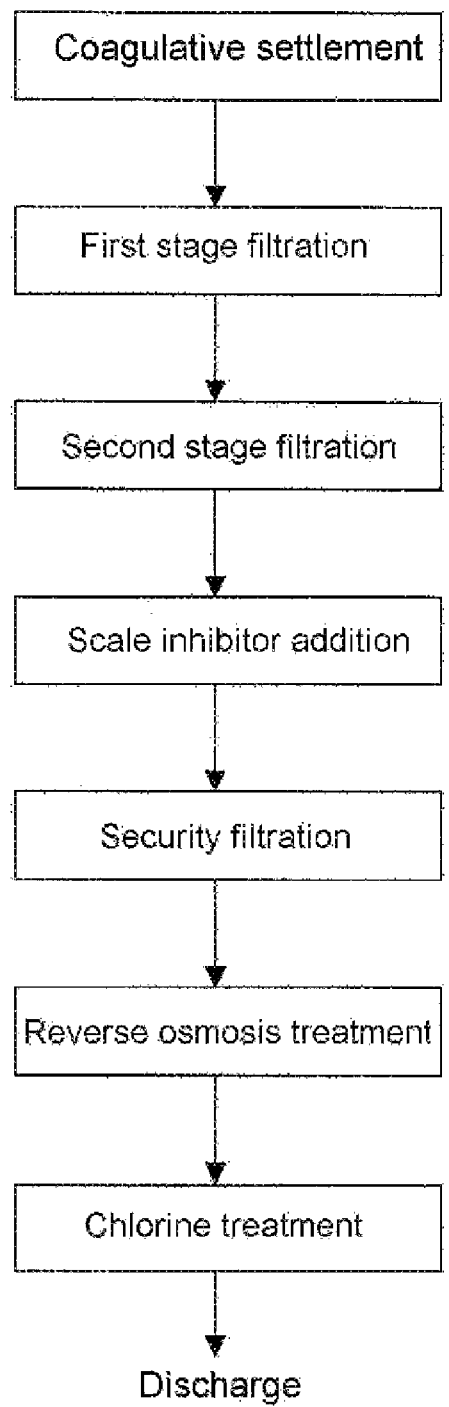
FIG. 1 shows a flowchart illustrating a method for treating landfill leachate in accordance with one embodiment of the invention.
Figure 2:
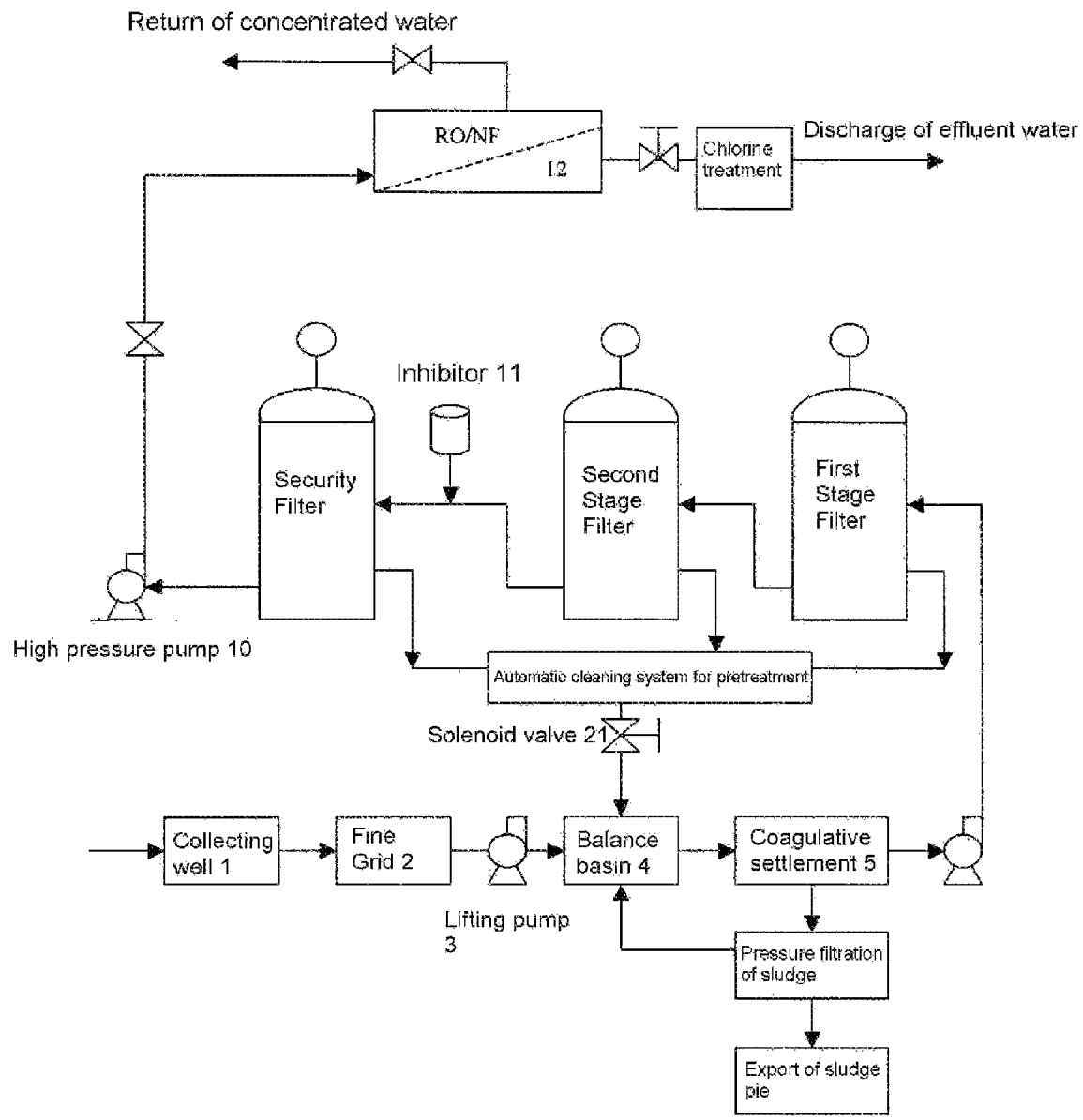
FIG. 2 shows a process flow diagram illustrating a method for treating landfill leachate in accordance with one embodiment of the invention.

With reference to FIG. 1 and FIG. 2, the leachate in a collecting well 1 from a sump for leachate, is conveyed to a wastewater balance basin 4 by a lifting pump 3 through a fine homogenizing grid 2. Thereafter, the leachate is injected into a coagulative settlement basin 5, wherein the leachate is coagulatively settled to produce a supernatant liquid in the upper portion of the basin and a solid cake in the lower portion of the basin.

During the settling, the pH of the leachate is adjusted, e.g., by blending into the leachate an appropriate flocculant PAC, coagulant PAM, and sodium hydroxide (NaOH). Generally, the weight ratio of added PAC to liquid leachate falls in the range of 0.05-0.5%, and the weight ratio of PAC: PAM is preferably 100:1-5. About 15-30 kg NaOH are added for every 1ton of leachate for the pH value to be adjusted to between 10.5-11, which is preferred for settling.

During blending, most suspended solids, such as sludge and particles in the leachate, are settled due to the continuous increase of floccules. After settling, the obtained sludge is pressed and filtered, and the sludge pie is exported back to the landfill site. The wastewater is directed back to the balance basin 4. The obtained supernatant liquid is directed for cartridge filtration, which acts as pretreatment for a reverse osmosis filtration so as to meet the basic requirements for reverse osmosis membrane separation.

As further shown in FIG. 2, the multistage cartridge filtration is realized by adopting a 3-stage cartridge filter with the pore size decreasing at each stage. In accordance with different influent concentrations in the first stage filter, wire wound cartridge with a pore size of 10-30 µm is employed. Polypropylene-type wire wound filter with pore size of 20 µm is particularly suitable. In accordance with the different cartridge installations, downflow or upflow filtration can be utilized.

Liquid leaving the first stage filter flows into the second stage filter for further filtration. In accordance with the monitored specific influent concentration, the pore size of the filter is employed in the range of 5-15 µm, preferably about 10 µm. Polypropylene-type wire wound cartridge, melt spinning cartridge, or compressed active carbon cartridge are preferred. Similarly, downflow or upflow filtration is applied in accordance with the different cartridge installations. The main purpose of the first and second stage filters is to remove particles and suspended solids.

The filtered liquid thereafter flows to the security filter for further filtration, wherein polypropylene type melt spinning cartridge is suitable, preferably with pore size of 3-10 µm, and more preferably with pore size of about 5 µm.

In each filter, the use of automatic cleaning system for automatic cleaning of the cartridge when the system is stopped is preferred so as to increase the filtration efficiency and thus to guarantee filtration effect. During a cleaning cycle, dirty cleaning water is directed to the wastewater balance basin 4 by manipulating a solenoid valve 21.

Scale inhibitor 11 (e.g., scale inhibitor WLW-1), at a concentration sufficient to prevent scaling, is optionally added into liquid discharged from said second stage filter prior to entry into said security filter. The amount of scale inhibitor is in the range of about 5-10 mg/L so as to effectively control the settlement of various inorganic salts such as calcium carbonate, calcium sulfate, strontium sulfate, ferric hydroxide, aluminum hydroxide, various silicates, etc.

Figure 3:
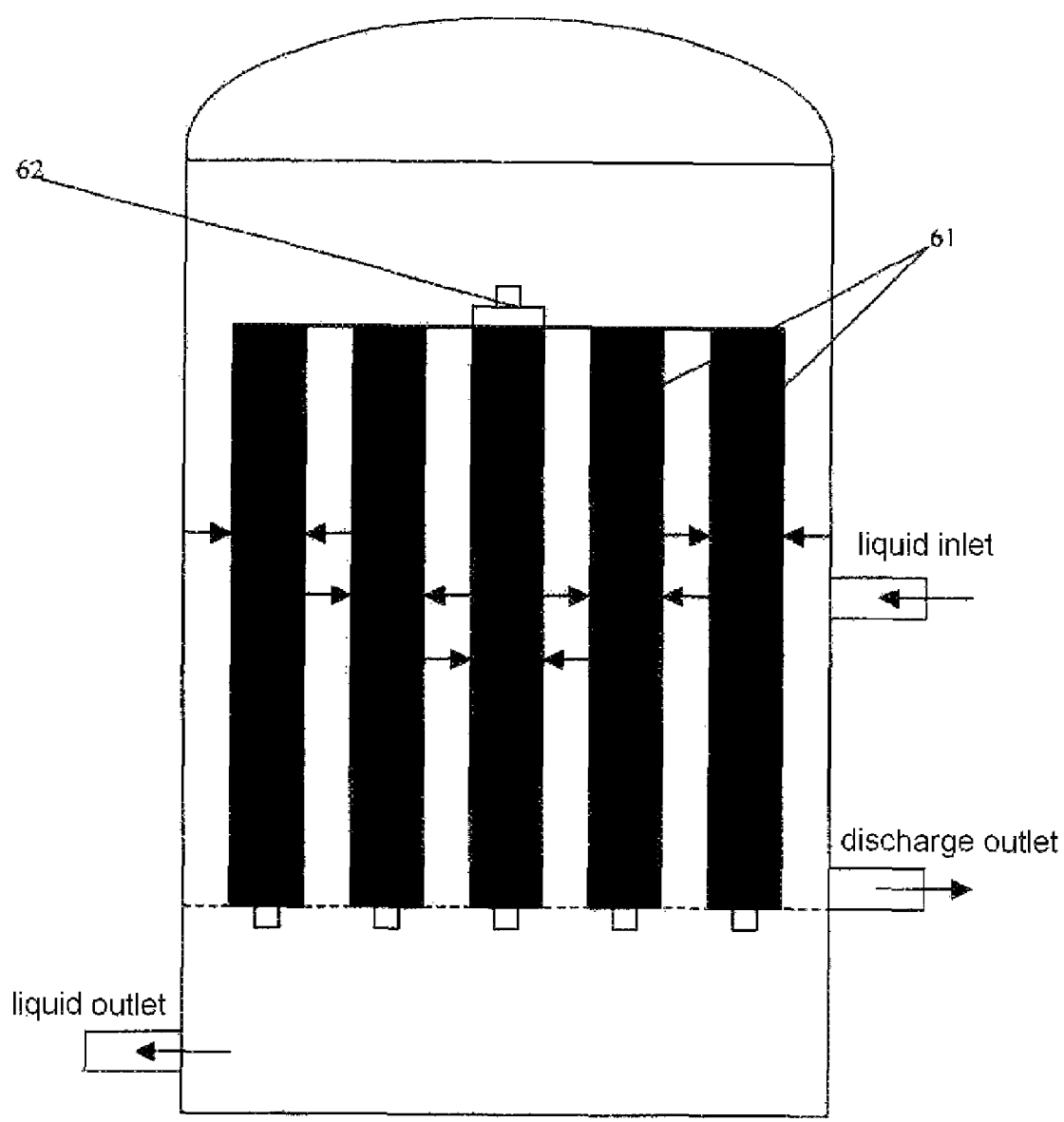
FIG. 3 shows a cross-section of a filter employed in a method for treating landfill leachate, in accordance with one embodiment of the invention.

In certain embodiments, a cartridge filter is employed as a filtration device, as shown in FIG. 3. A plurality of cartridges 61 and pressure covers 62 are used to maintain the filtration pressure in the filter. Particularly, good filtration efficiency is obtained when the pressure for filtration pressures in the range of about 0.2-0.6 MPa. The direction of arrows represents the flow of the liquid. The liquid to be filtered is taken in through the inlet, and is discharged after filtration from liquid outlet. The cartridge of each stage filter needs to be periodically cleaned; the wastewater generated from cleaning is returned to the balance basin 4 for treatment.

The turbidity of the leachate after passing through the three-stage filtration system is normally decreased to 1 NTU or less, and the density index of sludge (SDI) is lowered to 5 or less. Thus, after passing through the three-stage filtration system, the leachate meets liquid conditions for reverse osmosis filtration.

Other types of filtration devices that can be employed are without limitation pressure filters, vacuum filters, tubular filters, belt filters, cartridge filters, and upflow cartridge filters, etc.

The effluent liquid from the security filter is directed into a high pressure pump 10. In certain embodiments, low and high pressure switches are installed downstream and upstream of the high pressure pump. In certain embodiments, the effluent liquid from the security filter is directed to a middle liquid tank (not shown) before flowing into high pressure pump 10.

The high pressure pump 10 pumps the liquid (the first filtered liquid) to reverse osmosis filtration apparatus 12 for further filtration. In certain embodiments, the reverse osmosis filtration apparatus is a Reverse Osmosis/Nanofiltration (RO/NF) membrane system. In certain embodiments, good filtration efficiency is obtained when the influent liquid pressure into the RO/NF system is in the range of about 1.2-3.0 MPa, and the pumping lifts is about 220 m.

The main purpose behind employing reverse osmosis is to further remove the various contaminants, including organic substances, heavy metals, COD, BOD, NH3—N, etc. Specifically, approximately 99% of organic substance, more than 99% of heavy metals, 99% of $COD_{cr}$, and 99% of $BOD_5$ in the leachate are removed during reverse osmosis filtration; and the various inorganic salts, such as calcium carbonate, calcium sulfate, strontium sulfate, ferric hydroxide, aluminum hydroxide, silicate, etc., are removed to a significant extent. After this stage the purified liquid (the second filtered liquid) can be concentrated and returned back to the landfill.

However, at this stage the amount of ammonia nitrogen compounds in the leachate is not sufficiently reduced, with the removal rate being only about 50-60% of the initial concentrations. Therefore, in accordance with certain embodiments of the present invention, one or more chlorine-based oxidants are added into the effluent liquid from the reverse osmosis stage (the second filtered liquid) so as to convert the remaining ammonia nitrogen compounds into soluble nitrogen salts. The chlorine-based oxidants that are used for this purpose are without limitation selected from: liquid chlorine, chlorine gas, chlorine dioxide, sodium hypochlorite, and calcium hypochlorite, etc.

The ratio of added oxidants to treated liquid depends on the specific concentration of ammonia nitrogen compounds in the liquid to be treated which is easily monitored. Specifically, after oxidation, the concentration of ammonia nitrogen compounds in purified liquid is preferably below about 15 mg/L; and the concentrations of COD, BOD, and suspended solids are below about 100 mg/L, 30 mg/L, and 20 mg/L, respectively.

As a result of the oxidation step, the effluent liquid meets I grade discharge requirements published in standard for pollution control for domestic waste (GB16899-1997), and also meets liquid quality standard for miscellaneous liquid consumption (CJ25.1-89), and thus, can be discharged or recycled.

In summary, the treatment methods according to the present invention are based on physical and chemical processes, instead of lengthy and complicated biological pathways. The present invention provides methods for leachate treatment which feature easy equipment maintenance, compact structure, and simple process flow. Since the leachate is pretreated and filtered prior to reverse osmosis, reverse osmosis is carried out effortlessly, and its advantages are fully realized. The substances affecting the pollution index of the leachate are filtered in the pretreatment process using inexpensive and saturation-immune polypropylene wire wound cartridge or melt spinning cartridge, which is much more cost effective than using MBR/CMF, and has the advantage of simplicity and lower labor input over sand filtration and carbon filtration.

Specifically, for a plant with a daily capacity of 500 tons of leachate, the material cost for treating 1 ton of leachate is roughly only about $0.015, while under the same conditions the cost of sand or carbon filtration is about $0.0325, and the cost of the MBR/CMF process is about $0.0575. Thus, the economic benefits of the treatment methods according to the present invention are apparent.

DEFINITIONS

The term "landfill leachate," as used herein, refers to a wastewater seeped out from land filled site for various wastes when liquids such as rain water and underground water come in contact with these wastes. In certain embodiments of the invention described herein, landfill leachate contains various contaminants, such as ammonia nitrogen compounds, high BOD compounds, high COD compounds, and heavy metals. These substances are harmful to the environment and humans, and must be removed from leachate prior to it being allowed to enter the water cycle accessible to households.

The terms "security filtration" and "security filter," as used herein, refer to filtration apparatus used to remove relatively large particles upstream of reverse osmosis.

The terms "BOD" and "Biological Oxygen Demand," as used herein, refers to the amount of oxygen that would be consumed if all the oxidizable compounds present in one liter of landfill leachate were oxidized by bacteria and/or protozoa. The term "high BOD compounds" refers to compounds present in landfill leachate which would require high amounts of oxygen to be oxidized by bacteria and protozoa.

The term "COD" and "Chemical Oxygen Demand," as used herein as used herein, refers to the amount of oxygen that would be consumed if all the oxidizable compounds present in one liter of landfill leachate were oxidized chemically without the participation of bacteria and/or protozoa.

The terms "coagulatively settling" and "settling" as used herein with respect to landfill leachate refer to a process which allows particles dispersed and/or dissolved in landfill leachate to agglomerate and form settleable flocs (aggregated solid matter). The settling may occur as a result of gravity effects and/or may be precipitated or accelerated by adding various chemical compounds to the leachate.

The terms "Membrane Bioreactor," "Membrane Biological Reactor" and "MBR" as used herein, refer to wastewater treatment apparatus comprising biological reaction basin and membrane parts. The MBR is a water treatment technology formed by the combination of highly efficient membrane separation with active sludge technology, which offers the advantages of effectively separating solids from liquids, eliminating the expansion issues plaguing conventional sludge technologies, etc.

The terms "Continuous Membrane Filtration," "Continuous Microfiltration" and "CMF," as used herein, refer to liquid filtration technology which uses microporous membranes to remove contaminants from wastewater. Cross-flow filtration and batch automatic cleaning systems may be employed in connection with Continuous Membrane Filtration.

The term "PAC" and "Polyaluminum Chloride," as used herein, refer to a class of soluble aluminum products in which aluminum chloride has been partly reacted with a base. The relative amount of hydroxyls, compared to the amount of aluminum, determines the basicity of a particular PAC product. The molecular formula of PAC is often expressed in the form $Al_n(OH)_mCl_{(3n-m)}$. PAC is a macromolecular flocculant having multinuclear complexing characteristics.

The terms "PAM" and "Polypropylene Acyl Amine," as used herein, refers to a polymeric material, used mainly in treating sewage and strengthening paper, which accelerates the flocculant and settlement of the suspended solids in the liquid.

The terms "pump lift" and "pumping lift," as used herein, refer to power per unit of liquid transferred by a pump. The pump lift should be of a proper value; if too high, the pump consumes unnecessary power; if too low, the system cannot operate efficiently.

What is claimed is:

1. A method for treating landfill leachate comprising the steps of:
    (a) coagulatively settling the leachate to produce a supernatant liquid;
    (b) followed by, filtering said supernatant liquid through a filtration device to produce a first filtered liquid;
    (c) followed by filtering said first filtered liquid in a reverse osmosis apparatus to produce a second filtered liquid; and
    (d) followed by, treating said second filtered liquid with a chlorine-based oxidant to produce a purified liquid;
    Wherein
    said filtration device is a 3-stage filtration device comprising:
        a first stage cartridge filter having a wire wound cartridge with pore size of about 10-30 um;
        a second stage cartridge filter having a cartridge selected from a wire wound cartridge, and a melt-blown spun cartridge, said cartridge having pore size of 5-15 um; and
        a third stage cartridge filter having a melt spun cartridge with pore size of about 3-10 um;
    wherein a scale inhibitor is introduced between said second stage filter and said third stage filter; and
    wherein during coagulatively settling the leachate the pH of the leachate is adjusted between about 10.5 to 11.

2. The method of claim 1 wherein the filtration pressure in said first stage cartridge filter, said second stage cartridge filter, and/or said third stage cartridge filter is between about 0.2 and 0.6 MPa.

3. The method of claim 2, wherein the pressure of said first filtered liquid in said reverse osmosis apparatus is between about 1.2 and about 3 MPa.

4. The method of claim 1, wherein the pressure of said first filtered liquid in said reverse osmosis apparatus is between about 1.2 and about 3 MPa.

5. The method of claim 4, wherein said purified liquid comprises
    not more than 15 mg/L of nitrogen compounds,
    not more than 100 mg/L COD;
    not more than 30 mg/L BOD, and
    not more than 20 mg/L of suspended solids.

6. The method of claim 1, wherein
    said first stage cartridge filter has a wire wound cartridge with pore size of about 10 μm;
    said second stage cartridge filter has a cartridge selected from a wire wound cartridge, and a melt-blown spun cartridge, said cartridge having pore size of 15 μm; and
    said third stage cartridge filter has a melt spun cartridge with pore size of about 3μm.

7. The method of claim 1, wherein said purified liquid comprises
    not more than 15 mg/L of nitrogen compounds,
    not more than 100 mg/L COD;
    not more than 30 mg/L BOD, and
    not more than 20 mg/L of suspended solids.

8. The method of claim 1, wherein during coagulatively settling the leachate to produce a supernatant liquid, the pH of the leachate is adjusted to about 11.

* * * * *